(12) United States Patent
Ikeda et al.

(10) Patent No.: US 10,467,461 B2
(45) Date of Patent: Nov. 5, 2019

(54) APPARATUS FOR SEARCHING FOR OBJECT AND CONTROL METHOD THEREOF

(71) Applicant: CANON KABUSHIKI KAISHA, Tokyo (JP)

(72) Inventors: Kazuyo Ikeda, Yokohama (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/030,246

(22) Filed: Jul. 9, 2018

(65) Prior Publication Data

US 2019/0019016 A1 Jan. 17, 2019

(30) Foreign Application Priority Data

Jul. 11, 2017 (JP) ................................. 2017-135652

(51) Int. Cl.
*H04N 5/247* (2006.01)
*G06K 9/00* (2006.01)
*G06T 7/246* (2017.01)
*H04N 5/232* (2006.01)

(52) U.S. Cl.
CPC ..... *G06K 9/00288* (2013.01); *G06K 9/00281* (2013.01); *G06K 9/00295* (2013.01); *G06K 9/00771* (2013.01); *G06T 7/248* (2017.01); *H04N 5/23219* (2013.01); *H04N 5/247* (2013.01); *G06K 2209/21* (2013.01); *G06T 2207/10016* (2013.01); *G06T 2207/30201* (2013.01)

(58) Field of Classification Search
CPC ........... G06K 9/00288; G06K 9/00281; G06K 9/00295; G06K 9/00771; G06T 7/248; H04N 5/23219; H04N 5/247
USPC .......................................................... 348/159
See application file for complete search history.

(56) References Cited

U.S. PATENT DOCUMENTS

2016/0012597 A1* 1/2016 Wnuk ..................... G06T 7/246
382/103

FOREIGN PATENT DOCUMENTS

JP 201055594 A 3/2010

* cited by examiner

*Primary Examiner* — Nguyen T Truong
(74) *Attorney, Agent, or Firm* — Canon U.S.A., Inc. IP Division

(57) ABSTRACT

An apparatus which detects an object in a frame image of a moving image captured by each image capturing apparatus in an area, acquires an image feature of the detected object, tracks the detected object in one moving image, acquires an image feature of an object to be searched from the detected object, searches for an object having a similarity equal to or higher than a predetermined threshold from the acquired image features and identifies the object, acquires an image feature of the tracked object and corresponding to the identified object from the acquired image feature, and searches for an object having a similarity equal to or higher than the predetermined threshold from the acquired image features and identifies the object.

20 Claims, 9 Drawing Sheets

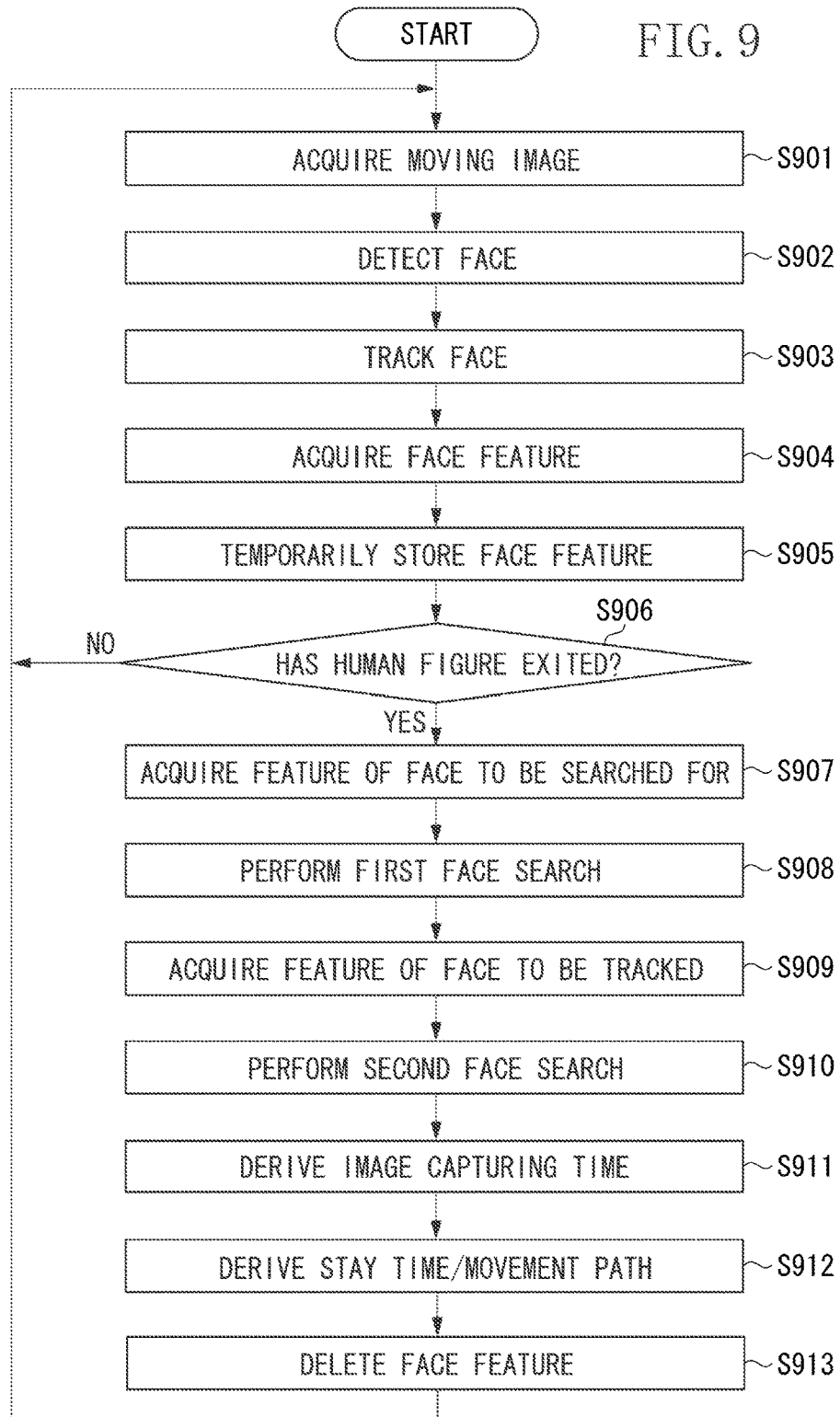

APPARATUS FOR SEARCHING FOR OBJECT AND CONTROL METHOD THEREOF

BACKGROUND

Field of the Disclosure

The present disclosure relates to a technique for searching for objects from images captured by a plurality of image capturing apparatuses.

Description of the Related Art

In recent years, there have been increasing cases where a plurality of monitoring cameras is installed in a store for security purposes. Further, a technique for not only acquiring video images for monitoring purposes but also detecting human figures in the video images and comparing the human figures based on image capturing results obtained by the cameras has been proposed. In such a manner, it has been also proposed to analyze a movement path of each human figure in a store and a stay time of each human figure in a predetermined location and to use the analysis results for the purpose of marketing research of the store. As a method for comparing human figures based on image capturing results obtained by the cameras, a method of using face authentication is generally employed.

For example, Japanese Patent Application Laid-Open No. 2010-55594 discusses a method for registering, as a face image to be authenticated, a face image of a human figure appearing in an image capture by a camera installed at an entrance of a store and comparing a face image of a human figure appearing in an image captured by each camera installed in the store is compared with the registered face image. The use of the determination result indicating that the compared human figures are identical enables acquisition of a movement path of the human figure in the store, and also enables acquisition of a stay time of the human figure by measuring the time during which the face images are matched.

An illumination condition and a relationship between the optical axis of a camera and the orientation of a face in a face image captured by the camera installed at the entrance of the store are different from those in a face image captured by each camera installed inside the store. Accordingly, the similarity between face images deteriorates, which may lead to a failure in the comparison between face images, or may lead to a situation where the movement path and the stay time cannot be accurately obtained.

To deal with such problems, Japanese Patent Application Laid-Open No. 2010-55594 discusses a method in which second and subsequent face images are additionally registered for use in comparison according to a threshold for determination of the similarity between face images that have failed in matching.

However, in the method in which face images are additionally registered in a sequential manner as discussed in Japanese Patent Application Laid-Open No. 2010-55594, a failure may occur in the comparison performed before face images are additionally registered. Further, since only the similarity between face images to be compared is used as a criterion for additionally registering face images, a face image of another human figure different from the target human figure may be registered, and thus the comparison may be performed with the different human figure.

For example, like in a similar image search system, in a method in that a search is simply performed using face images prepared in advance, and then a search is performed using the similarity between faces is not enough, if a threshold value for the similarity adopted as a search result is increased, a search omission may occur. If the threshold value is lowered, an issue may occur in that a human figure that is different from the human figure designated in the search may be output as a search result.

If an error, such as a comparison error and a search error, has occurred as described above, there is still an issue in that the movement path and the stay time cannot be accurately obtained.

Accordingly, there is a need for an information processing apparatus capable of efficiently recognizing the appearance of a target human figure (object) in an image captured by each of a plurality of image capturing apparatuses in an area in which the plurality of image capturing apparatuses is installed.

SUMMARY

According to an aspect of the present disclosure, an information processing apparatus includes a moving image acquisition unit configured to acquire a moving image captured by each of a plurality of image capturing apparatuses in an area in which the plurality of image capturing apparatuses is installed, a detection unit configured to detect objects appearing in a frame image of the acquired moving image, a first feature acquisition unit configured to acquire an image feature of the detected object, a storage unit configured to store the acquired image feature, a tracking unit configured to track the detected object in one moving image, a second feature acquisition unit configured to acquire an image feature of an object to be searched from among the detected object, a first search unit configured to search for an object having a similarity equal to or higher than a predetermined threshold from among image features stored in the storage unit and identify the object, based on the image feature acquired by the second feature acquisition unit, a third feature acquisition unit configured to acquire an image feature of the object tracked by the tracking unit and corresponding to the object identified by the first search unit from among the image features stored in the storage unit, and a second search unit configured to search for an object having a similarity equal to or higher than the predetermined threshold from among the image features stored in the storage unit and identify the object, based on the image feature acquired by the third feature acquisition unit.

Further features of the present disclosure will become apparent from the following description of exemplary embodiments with reference to the attached drawings.

BRIEF DESCRIPTION OF THE DRAWINGS

FIG. 9 is a flowchart illustrating an example of a processing procedure in which the information processing apparatus analyzes a movement of each human figure in a store and derives a movement path and a stay time of each human figure based on the analysis result.

DESCRIPTION OF THE EMBODIMENTS

Exemplary embodiments of the present disclosure will be described in detail below with reference to the drawings. The exemplary embodiments described below illustrate specific examples in which the present disclosure is carried out. The present disclosure is not limited to the exemplary embodiments described below.

Figure 1:
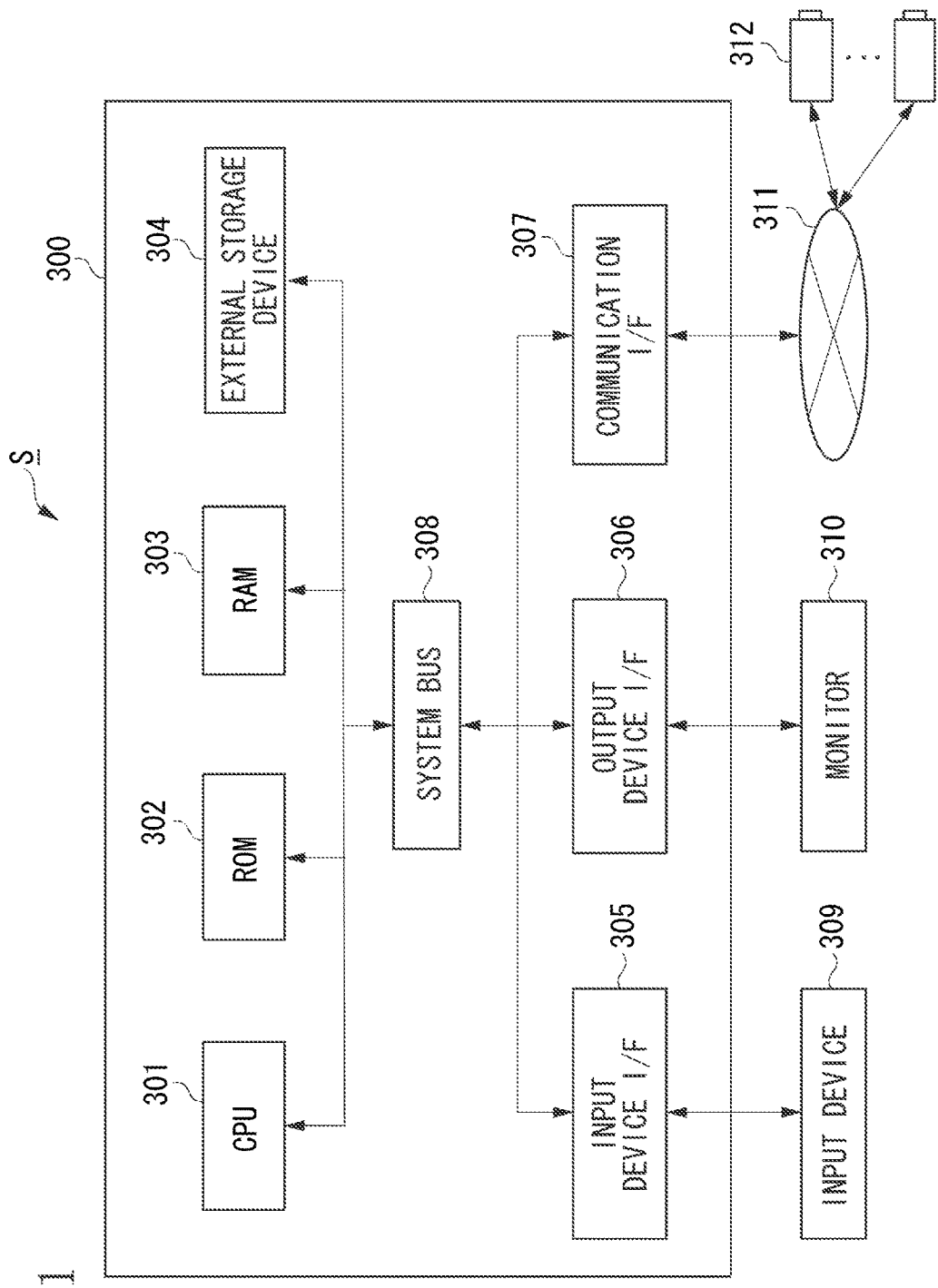
FIG. 1 is a block diagram illustrating a configuration of an information processing system according to one or more aspects of the present disclosure.

FIG. 1 is a block diagram illustrating a configuration of an information processing system according to a first exemplary embodiment.

An information processing system S includes an information processing apparatus 300, an input device 309, a monitor 310, and network cameras 312.

As a hardware configuration of the image processing apparatus 300, for example, the information processing apparatus 300 may be configured as a single image processing apparatus as illustrated in FIG. 1. Alternatively, like a server apparatus, a client apparatus, or the like, functions of the information processing apparatus 300 may be distributed to a plurality of image processing apparatuses. For example, when the information processing apparatus 300 is composed of a plurality of image processing apparatuses, the image processing apparatuses are connected to each other via a local area network (LAN) or the like such that the information processing apparatuses can mutually communicate with each other. Each information processing apparatus can be implemented by an information processing apparatus such as a personal computer (PC) or a workstation (WS).

The information processing apparatus 300 includes a central processing unit (CPU) 301, a read only memory (ROM) 302, a random access memory (RAM) 303, and an external storage device 304. The information processing apparatus 300 also includes an input device interface (I/F) 305, an output device I/F 306, a communication I/F 307, and a system bus 308.

The CPU 301 controls the entire operation of the information processing apparatus 300. The ROM 302 stores programs and parameters which requires no change. The RAM 303 temporarily stores programs and data supplied from an external device or the like.

The operation of each functional unit of the information processing apparatus 300 to be described below is executed by causing the CPU 301 to executes programs stored in a computer-readable storage medium such as the ROM 302.

The external storage device 304 is a storage device, such as a hard disk or a memory card, which is installed in the information processing apparatus 300. The external storage device 304 can be configured using a device which is attachable to and detachable from the information processing apparatus 300, such as a flexible disk (FD), an optical disk such as a compact disk (CD), a magnetic or optical card, an integrated circuit (IC) card, and a memory card.

The input device I/F 305 is an interface for receiving an operation from a user through the input device 309, such as a pointing device or a keyboard, which is used to input data.

The output device I/F 306 is an interface for displaying data held by the information processing apparatus 300, data supplied to the information processing apparatus 300, or the like on a display screen of the monitor 310 which functions as a display device.

The communication I/F 307 is a communication interface for connecting the information processing apparatus 300 to a network line 311 such as the Internet.

The system bus 308 is a transmission line for connecting the units 301 to 307 to each other in a communicable manner.

Each of the network cameras 312 is an image capturing apparatus that captures a video image, such as a monitoring camera installed to monitor a state within a store. Each of the network cameras 312 is connected to the information processing apparatus 300 via the network line 311.

Figure 2:
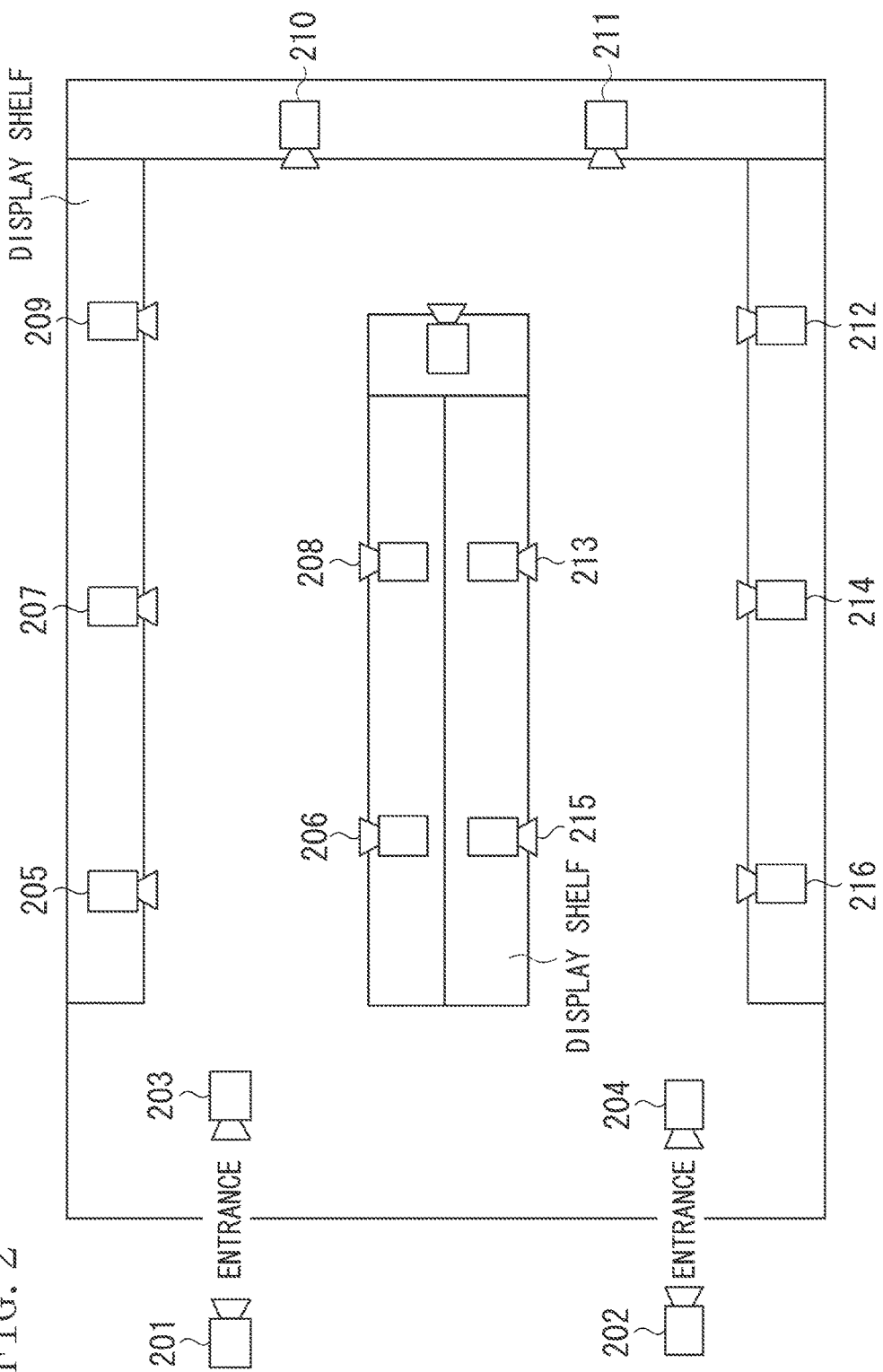
FIG. 2 illustrates a use case in which an information processing apparatus derives a movement path and a stay time of each human figure in a store through network cameras.

FIG. 2 illustrates a use case in which the information processing apparatus 300 derives a movement path and a stay time of each human figure in a store through network cameras.

FIG. 2 illustrates an example in which network cameras are arranged according to the layout of display shelves in the store. The following description is made assuming that the information processing system S searches for human figures present in the store and derives the movement path and the stay time of each of the human figures based on the search result.

Network cameras 201 and 202 are each arranged so as to capture images in the direction of an entrance of the store and capture images of human figures that go out of (leave) the store. Network cameras 203 and 204 are each arranged so as to capture images in the direction of the entrance of the store and capture images of human figures that enter the store from the outside. Network cameras 205 to 216 are arranged according to the layout of display shelves in the store and capture images of human figures present in the store.

Assume that the movement path and the stay time of each human figure present in the store are obtained using image capturing results (moving images) obtained by the network cameras 201 to 216 which are arranged in predetermined areas as described above. The network cameras 201 to 216 correspond to the network cameras 312 illustrated in FIG. 1.

Figure 3:
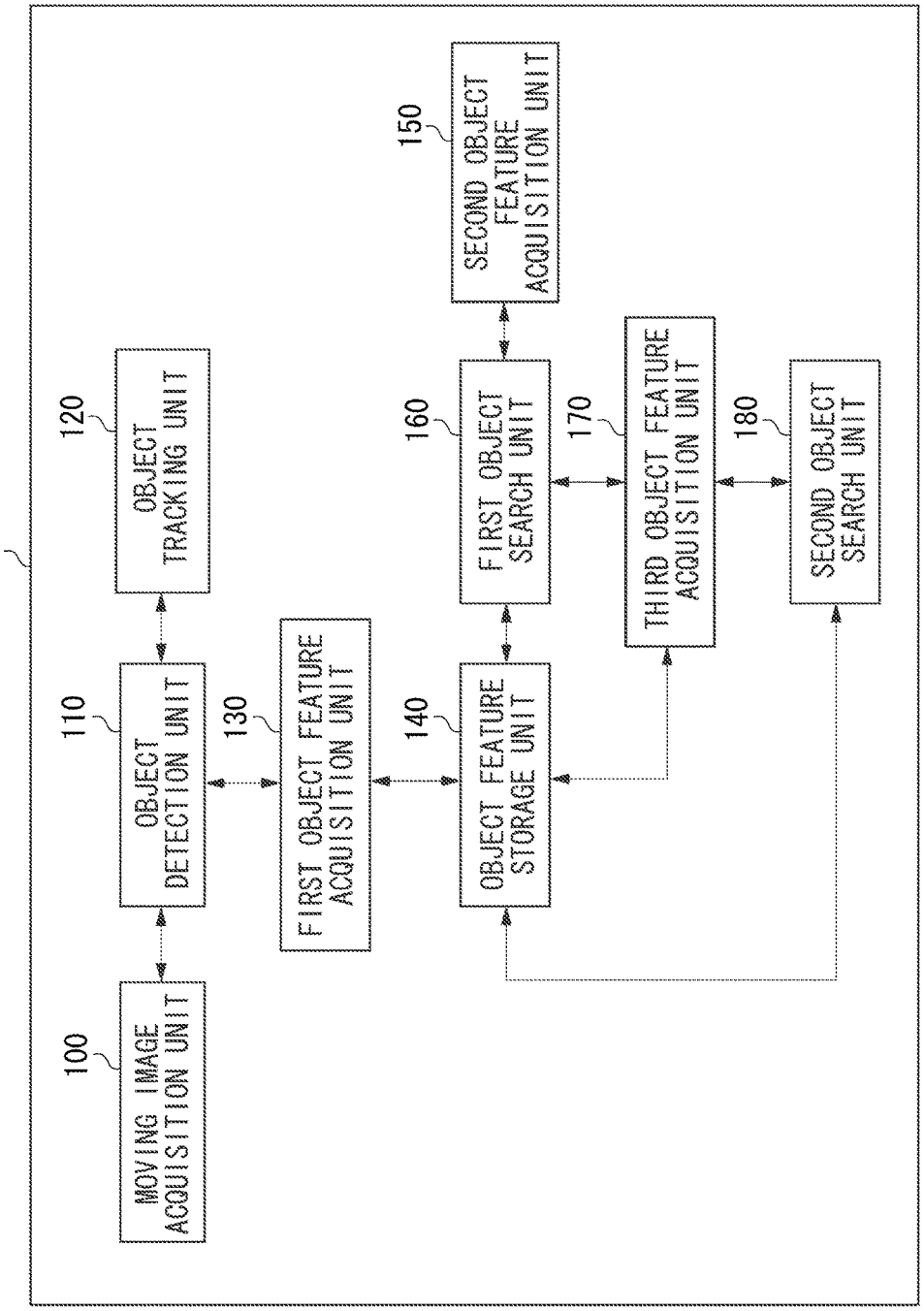
FIG. 3 is a block diagram illustrating a functional configuration of the information processing apparatus.

FIG. 3 is a block diagram illustrating an example of the functional configuration of the information processing apparatus 300.

The information processing apparatus 300 includes a moving image acquisition unit 100, an object detection unit 110, an object tracking unit 120, a first object feature acquisition unit 130, an object feature storage unit 140, a second object feature acquisition unit 150, a first object search unit 160, a third object feature acquisition unit 170, and a second object search unit 180.

The moving image acquisition unit 100 acquires image capturing results (e.g., moving images) of the respective network cameras 201 to 216.

The object detection unit 110 detects, based on the moving images acquired by the moving image acquisition unit 100, objects appearing in frame images of the moving images. The following description is given assuming that, in the information processing apparatus 300 according to the present exemplary embodiment, an "object" is a human figure and the object detection unit 110 is to detect the face (face position) of a human figure.

The object tracking unit 120 tracks the human figure based on the face of the human figure detected through the object detection unit 110. Specifically, matching of "faces" of the same human figure between frames of one moving image acquired by the moving image acquisition unit 100 is performed to thereby identify the same human figure (object). Further, the object tracking unit 120 assigns, to each human figure appearing in the moving image, a human figure ID for distinguishing the human figure from other human figures and derives an appearance time and a disappearance time of each human figure in the moving image. Tracking a human figure in such a manner as described above enables recognition of the movement path of the human figure.

The first object feature acquisition unit 130 extracts a feature amount (query feature amount) for identifying the human figure based on a face image of the human figure detected by the object detection unit 110 and acquires the feature amount (image feature) of the image.

The object feature storage unit 140 stores the image feature (feature amount) acquired by the first object feature acquisition unit 130 in the external storage device 304. The feature amount of the image is stored in association with the human figure ID assigned by the object tracking unit 120, the appearance time and the disappearance time of the human figure, and a camera ID for uniquely identifying the camera which has captured the image of the human figure.

The second object feature acquisition unit 150 acquires the image feature (feature amount) of the face of the human figure based on image capturing results (moving images) obtained by the network cameras 201 and 202 that capture images of human figures that moves from the inside to the outside of the store. The second object feature acquisition unit 150 may be configured to acquire the feature amount of the face image of the human figure stored in the object feature storage unit 140.

The information processing system S searches for human figures in the store and derives the movement path and the stay time of each human figure based on the search result. Accordingly, a human figure (object) to be searched for is a human figure that enters the store and then leaves the store.

The first object search unit 160 searches for the faces of human figures appearing in each of the network cameras 203 to 216 that are stored in the object feature storage unit 140 based on the feature amount of the face image acquired by the second object feature acquisition unit 150. Specifically, the first object search unit 160 calculates, for example, a similarity between the query feature amount and the image feature (feature amount) stored in the object feature storage unit 140 and derives the human figure ID corresponding to the feature amount having a similarity equal to or higher than a predetermined similarity based on the calculation result, to thereby identify the human figure.

The third object feature acquisition unit 170 acquires, from the object feature storage unit 140, the feature amount of the face image of the human figure associated with the human figure ID derived by the first object search unit 160.

The second object search unit 180 searches for the faces of human figures appearing in each of the network cameras 203 to 216 that are stored in the object feature storage unit 140 based on the feature amount of the face image of the human figure acquired by the third object feature acquisition unit 170.

Figure 4:
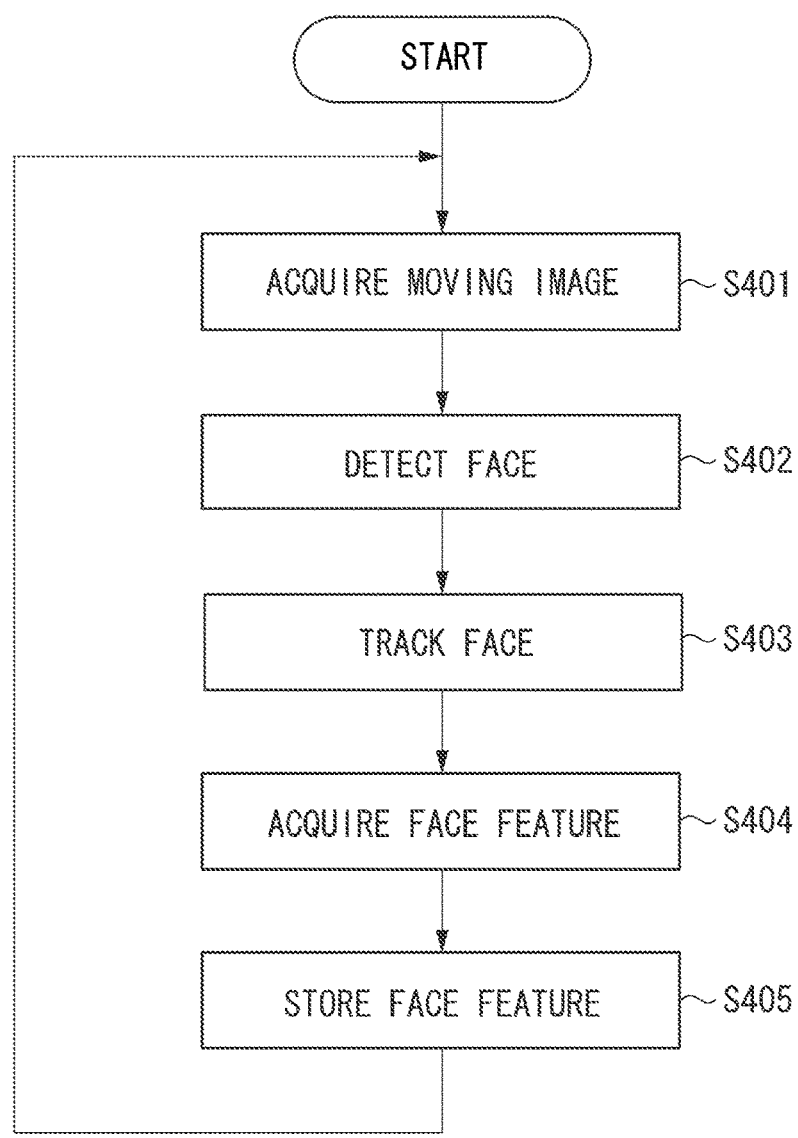
FIG. 4 is a flowchart illustrating an example of a processing procedure in which the information processing apparatus records a movement (entering or leaving a store and a movement inside a store) of each human figure in a store.

FIG. 4 is a flowchart illustrating an example of a processing procedure in which the information processing apparatus 300 records a movement (entering or leaving the store and moving within the store) of each human figure in the store.

Each process illustrated in FIG. 4 is executed by functional units that are mainly implemented by the CPU 301.

In step S401, the moving image acquisition unit 100 acquires image capturing results (moving images) of the respective network cameras.

In step S402, the object detection unit 110 detects a face (face position) appearing in frame images of each of a plurality of moving images acquired by the moving image acquisition unit 100. As a method for detecting a face, for example, the Viola-Jones method, which is widely known, can be used.

In step S403, the object tracking unit 120 tracks each human figure detected by the object detection unit 110 in each of the acquired moving images. In the tracking process, for example, matching of the faces of the same human figure between frames of one moving image is performed, and a human figure ID for distinguishing the human figure appearing in the moving image from other human figures is assigned to the human figure.

Matching of human figures between frames can be performed by predicting the position of the human figure in the current frame based on the positions thereof in the previous frames by using a Kalman filter and matching faces detected at a position closest to the predicted position. If a human figure turns his/her back toward a camera and the face of the human figure cannot be seen, matching of the human figures between frames can be performed by detecting a human body and estimating the positions of the faces of the human body.

As a method for detecting a human figure (human body), for example, a detection method using Histograms of Oriented Gradients (HOG) proposed by Dalal and Triggs can be employed.

If neither a face nor a human body can be detected, matching can be performed by template matching using a color histogram or the like. However, the reliability of matching by template matching is low. Accordingly, assume that if template matching is performed using a predetermined number or more of frames, the tracking process is terminated and a human figure ID is newly issued to the human figure so that the human figure can be regarded as a different person.

Further, based on the detection result and the predicted position, it is determined whether crossing of human figures (objects) to be tracked is likely to occur. If it is determined that crossing of human figures occurs, the tracking process is terminated and a human figure ID is newly issued to the human figure so that the human figure can be regarded as a different person.

This helps to avoid the following problem. That is, if there is an error in tracking of a human figure, the third object feature acquisition unit 170 acquires the feature amount of a face image of another human figure other than the search target human figure through the first object search unit 160, so that the second object search unit 180 erroneously performs the search.

The object tracking unit 120 derives the appearance time and the disappearance time of each of the tracked human figures in each network camera. The appearance time refers to a time when the human figure is first detected by the object detection unit 110. The disappearance time refers to a time when tracking of the human figure is terminated, or a time when the human figure leaves the store and tracking of the human figure is ended.

In step S404, the first object feature acquisition unit 130 extracts the feature amount of the face image for identifying the human figure based on the face image of the human figure detected by the object detection unit 110, to thereby acquire the image feature. As a method for acquiring the feature amount of the face image, for example, Local Binary Pattern (LBP) which is widely used as a method for obtaining a feature amount of a face image can be used.

In step S405, the object feature storage unit 140 stores the image feature (feature amount) acquired by the first object feature acquisition unit 130 in the external storage device 304.

The feature amount is stored in association with the human figure ID assigned by the object tracking unit 120, the appearance time and the disappearance time of the human figure, and the camera ID of the network camera which has captured the image of the human figure. After that, the processing returns to step S401.

Figure 5:
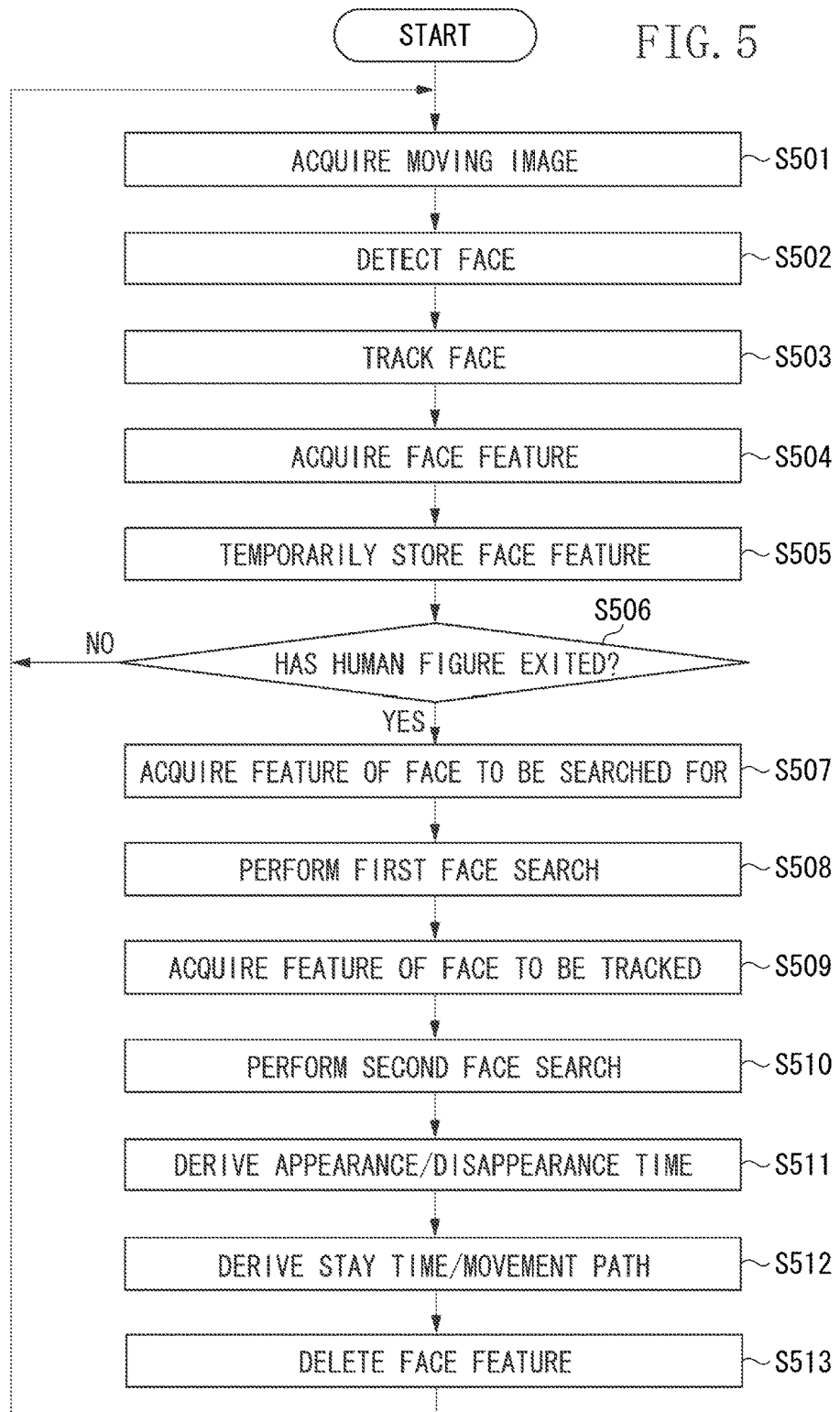
FIG. 5 is a flowchart illustrating an example of a processing procedure in which the information processing apparatus searches for human figures in a store and derives a movement path and a stay time of each human figure based on the search result.

FIG. 5 is a flowchart illustrating an example of a processing procedure in which the information processing apparatus 300 searches for human figures in the store and derives a movement path and a stay time of each human figure based on the search results. Each process illustrated in FIG. 5 is executed by functional units that are mainly implemented by the CPU 301.

In step S501, the second object feature acquisition unit 150 acquires image capturing results (moving images) of the respective network cameras 201 and 202 through the moving image acquisition unit 100.

In step S502, the second object feature acquisition unit 150 detects a face (face position) appearing in each frame image of a plurality of moving images acquired in the processing of step S501 through the object detection unit 110.

In step S503, the second object feature acquisition unit 150 performs tracking of each human figure detected in the processing of step S502 in each of the acquired moving images through the object tracking unit 120. This processing is similar to the processing of step S403, and thus detailed descriptions thereof, other than that a human figure ID is assigned to each human figure as in the processing of step S403, are omitted here.

In step S504, the second object feature acquisition unit 150 extracts, based on the face image of the human figure detected in the processing of step S502, the feature amount of the face image to identify the human figure and acquires the image feature, through the first object feature acquisition unit 130. This processing is similar to the processing of step S404, and thus detailed descriptions thereof are omitted.

In step S505, the second object feature acquisition unit 150 temporarily stores the feature amount of the face image acquired in the processing of step S504 in the RAM 303. The feature amount is stored in association with the human figure ID assigned in the processing of step S503.

In step S506, the second object feature acquisition unit 150 determines whether the human figure to be tracked in the processing of step S503 has moved from the inside of the store to the outside of the store, i.e., whether the human figure to be tracked has exited the store.

For example, the network cameras 201 and 202 each capture images in the direction of the entrance of the store from the outside of the store as illustrated in FIG. 2 and are installed on a ceiling. Accordingly, it is determined that the human figure has left the store (the human figure to be tracked has exited the store) if the human figure has disappeared from a lower end of the frame image.

If the second object feature acquisition unit 150 determines that the human figure to be tracked has exited the store (YES in step S506), the processing proceeds to step S507. If the second object feature acquisition unit 150 determines that the human figure to be tracked has not exited the store (NO in step S506), the processing returns to step S501.

In step S507, the second object feature acquisition unit 150 acquires the face feature of the human figure that has determined to have exited the store in the processing of step S506 from the feature amounts of the face images temporarily stored in the processing of step S505. In the processing of step S505, the feature amount of the face image of the human figure and the human figure ID are stored in association with each other. Accordingly, the use of the human figure ID issued in the processing of step S503 facilitates the acquisition of the feature amount of the face image.

In step S508, based on the feature amount of the face image acquired in the processing of step S507, the first object search unit 160 searches for the human figure ID of the same human figure as the human figure that has exited the store from the human figure IDs stored in the object feature storage unit 140.

Specifically, for example, the similarity between the feature amount acquired in the processing of step S507 and the feature amount stored in the object feature storage unit 140 is calculated. When the similarity is equal to or higher than a predetermined threshold, the human figure ID and the camera ID corresponding to the calculated similarity are obtained as a search result.

The feature amount is generally represented by a vector. Accordingly, a L2 distance or an inner product may be used as the similarity. In the processing of step S507, feature amounts of a plurality of face images are generally acquired. Therefore, a search may be performed using all the feature amounts. Alternatively, a search may be performed after reducing the number of feature amounts, like in processing of step S601 to be described below.

In step S509, the third object feature acquisition unit 170 acquires, from the object feature storage unit 140, the image feature (feature amount) of the face of the human figure associated with the human figure ID searched for in the processing of step S508.

The object feature storage unit 140 stores the feature amounts of face images of each human figure obtained as a result of tracking in the processing of step S403 in association with the human figure IDs. Accordingly, it can also be said that the third object feature acquisition unit 170 acquires the feature amount of the face image by tracking the search target human figure in the processing of step S508.

In step S510, the second object search unit 180 searches for the feature amount of the human figure ID of the same human figure as the human figure that has exited the store from the human figure IDs stored in the object feature storage unit 140 based on the feature amount of the face image of the human figure acquired in the processing of step S509. The CPU 301 acquires the searched feature amount and the human figure ID and the camera ID corresponding to the searched feature amount.

In this processing, the use of the feature amount of the face image of the human figure acquired in the processing of step S509 enables a search for the human figure ID that cannot be searched for by the first object search unit 160 in the processing of step S508. Details of the processing will be described below with reference to FIG. 6.

In step S511, the second object search unit 180 derives the time when the human figure that has exited the store in the processing of step S506 is appearing in a moving image captured by each network camera, i.e., the time (appearance time) when the human figure first appears in a moving image captured by each camera, and the time (disappearance time) when the human figure disappears from a moving image captured by each camera.

In this case, the earliest time among the appearance times which are stored in the object feature storage unit 140 and associated with the human figure ID searched for in the processing of step S510 is set as the time when the human figure first appears in the moving image captured by each camera. The latest time among the disappearance times which are stored in the object feature storage unit 140 in association with the human figure ID searched for in the processing of step S510 is set as the disappearance time when the human figure disappears in the moving image captured by each camera.

In step S512, the second object search unit 180 derives the stay time (time spent in the store) of the human figure that has exited the store in the processing of step S506.

For example, the stay time in the moving image captured by each camera can be derived by subtracting the appearance time derived in the processing of step S511 from the disappearance time derived in the processing of step S511. Further, the earliest one among the appearance times derived from the moving image of each camera in the processing of step S511 is set as the earliest appearance time. In a similar manner, the latest one among the disappearance times derived from the moving image of each camera in the processing of step S511 is set as the latest disappearance time. The time (stay time) during which the human figure has stayed in the store before exiting the store can be derived by subtracting the earliest appearance time from the latest disappearance time.

The second object search unit 180 derives the movement path of the human figure that has exited the store in the processing of step S506 and displays the movement path together with the stay time on the monitor 310.

Arranging the appearance times derived from the moving images of the cameras in chronological order enables derivation of the order in which the target human figure has appeared in the moving image of each camera, i.e., the movement path of the human figure.

The movement path can be displayed in such a manner that, for example, the layout of the store and the network cameras as illustrated in FIG. 2 are displayed on the display screen of the monitor 310, and a line is drawn to sequentially connect between the cameras according to the order in which the target human figure has appeared in the moving image of each camera.

When a line is drawn to include those cameras that include only the human figure ID searched for by the second object search unit 180 by lowering the threshold for the similarity (threshold for determining the similarity) in the processing of step S605 to be described below, the reliability of the search decreases as the threshold for the similarity is lowered. The color of the line to be displayed is, thus, changed depending on the value of the threshold.

Similarly, the reliability of the stay time decreases as the threshold for the similarity is lowered. Therefore, the display is performed such that the appearance times derived from the cameras added by lowering the threshold are recognizable. For example, a display form, such as a pie chart or a bar graph, in which the proportion of the time for each threshold can be easily visualized is used. Specifically, the proportion of the stay time for each threshold value is displayed together with numerical displays of the stay time derived from each camera and the stay time that is a period from a time when the human figure enters the store to a time when the human figure leaves the store.

In step S513, the second object search unit 180 deletes all of the pieces of information stored in the object feature storage unit 140 in association with the human figure ID searched for in the processing of steps S508 and S510, i.e., the feature amount of the face image, the appearance time, the disappearance time, the camera ID, and the human figure ID.

After that, the processing returns to step S501.

Figure 6:
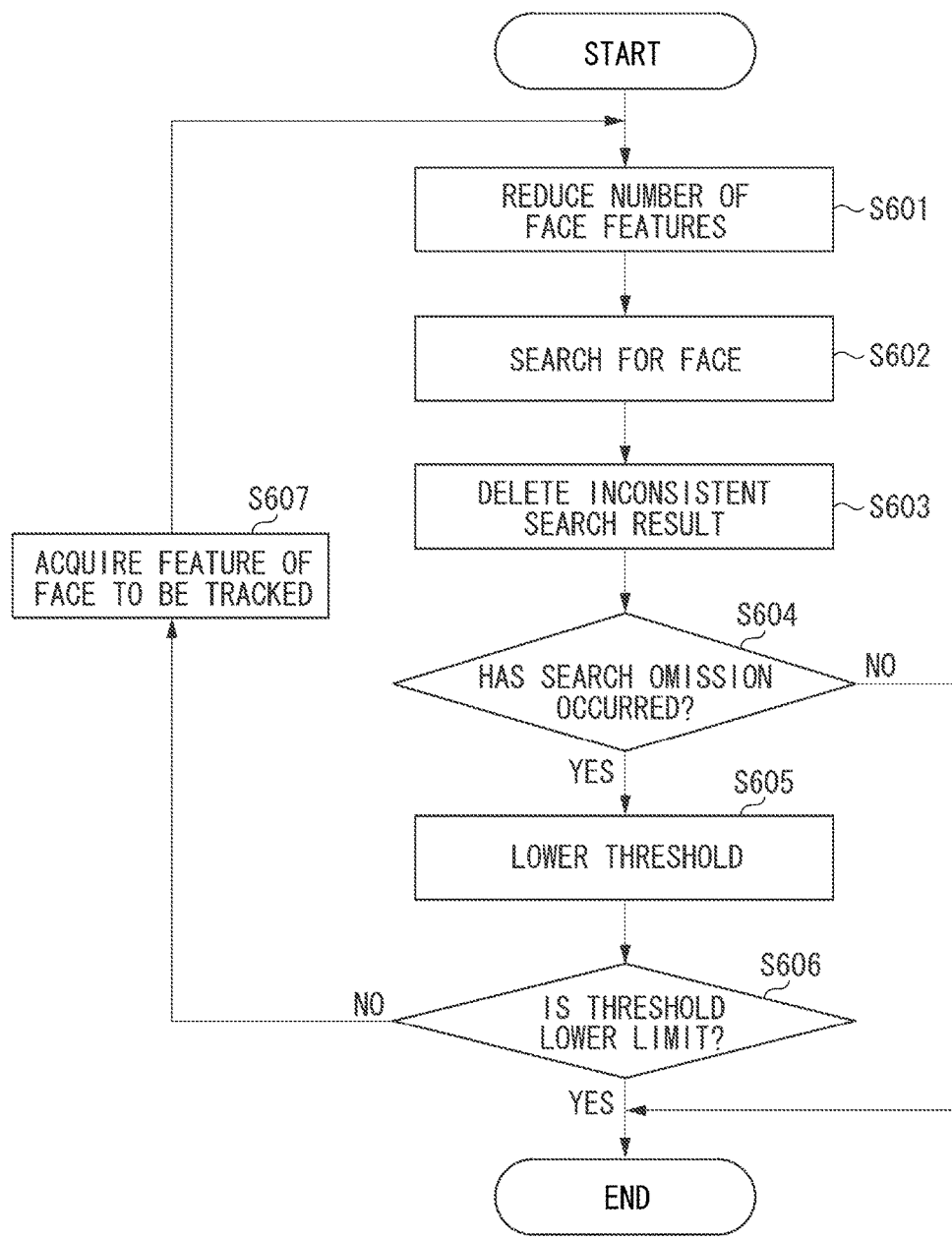
FIG. 6 is a flowchart illustrating details of processing of step S510.

FIG. 6 is a flowchart illustrating details of the processing of step S510.

In step S601, the second object search unit 180 reduces the number of feature amounts of the face images acquired in the processing of step S509. As conditions for reducing the number of feature amounts of the face images, i.e., conditions for excluding feature amounts from search targets, the following conditions may be used. For example, the feature amount of the face image that has been already searched for in the processing of step S508 is to be deleted. In addition, the feature amount of the face image that is searched for in the processing of step S602 to be described below is also to be deleted.

Next, the number of feature amounts of the face image is reduced for each camera. The similarity between the feature amounts corresponding to the same camera is calculated. If the similarity is higher than a predetermined threshold, one of the feature amounts is deleted. As a criterion for deleting a feature amount, a feature amount having the larger number of similarities with other feature amounts that exceeds the threshold is to be deleted. If the feature amounts have the same number of similarities with other feature amount that exceeds the threshold, one having the largest sum of similarities with other feature amounts is to be deleted. Next, the remaining feature amounts in all the cameras are also deleted based on the similarities with other feature amounts.

As a method for reducing the number of feature amounts, a condition based on a similarity between image capturing scenes, i.e., a similarity between image capturing conditions, may be used. For example, the feature amounts may be classified depending on the direction of a face or the illumination, and a feature amount having the lowest similarity with the feature amount of the face image acquired in the processing of step S507 may be selected for the direction of a face or the illumination.

For example, the direction of a face is obtained after the face is detected in the processing of step S402 and the direction of the face is stored in association with the feature amount of the face image in the processing of step S405, thereby enabling the processing to be performed in this step.

In step S602, based on the feature amounts of the face images obtained as the result of the reduction in the processing of step S601, the second object search unit 180 searches for the feature amount of the human figure ID of the same human figure as the human figure that has exited the store from the human figure IDs stored in the object feature storage unit 140. The CPU 301 acquires the feature amount and the human figure ID and the camera ID corresponding to the feature amount. This processing is similar to the processing of step S508, and thus detailed descriptions thereof are omitted.

In step S603, the second object search unit 180 deletes a human figure ID that is inconsistent in terms of a movement path from among the human figure IDs searched for in the processing of step S602. The term "inconsistent human figure ID" used herein refers to a human figure ID for a human figure that is identified (searched) in both cameras which cannot capture images of the human figure simultaneously, for example, in the network cameras 206 and 213.

Specifically, when the appearance times in the cameras overlap with each other as a result of deriving the appearance time and the disappearance time in each camera, it can be determined that there is an inconsistency. If there is such an inconsistency, the similarity between the feature amount acquired in the processing of step S507 and the feature amounts searched in the processing of step S508 or S602 is calculated and the feature amount having a lowest similarity is deleted. When the feature amount is deleted, the human figure ID corresponding to the feature amount is also deleted. Then, it is determined again whether there is an inconsistency, and the processing of deleting a feature amount having a lowest similarity one by one is repeated until no inconsistency is found.

In step S604, the second object search unit 180 determines whether there is any movement path that has not been searched, i.e., whether a search omission has occurred. If it is determined that a search omission has occurred (YES in step S604), the processing proceeds to step S605.

For example, if some of the cameras, such as the network cameras 203 and 204 for capturing images of human figures entering the store, cannot detect the human figures that are supposed to pass through the movement path, there is an inconsistency in the movement path and thus it is determined that a search omission has occurred.

It can be determined whether the search result is included in both the network cameras 203 and 204, based on whether the corresponding camera ID remains as the search result.

In step S605, the second object search unit 180 lowers the threshold for the similarity used in the processing of step S602 by a predetermined value.

In step S606, the second object search unit 180 determines whether the threshold value lowered in the processing of step S605 is a lower limit value. If the threshold value is not the lower limit value (NO in step S606), the processing proceeds to step S607.

In step S607, the third object feature acquisition unit 170 acquires, from the object feature storage unit 140, the feature amount of the face image of the human figure corresponding to the human figure ID associated with the human figure ID which remains without being deleted in the processing of step S603. After that, the processing returns to step S601.

As described above, the information processing apparatus 300 according to the present exemplary embodiment is capable of searching for objects (human figures) captured by a plurality of cameras without causing an omission and error. Specifically, the information processing apparatus 300 extracts image features (feature amounts) of a tracked object and performs a search using the feature amounts.

Further, since a plurality of feature amounts of a tracked object is obtained, the use of all of the obtained feature amounts for search leads to an increase in processing time. The information processing apparatus 300 performs a search after deleting similar feature amounts therefrom, thereby making it possible to reduce the processing time and perform detection processing efficiently.

Further, the information processing apparatus 300 repeatedly performs a search by gradually lowering the threshold for the similarity used in the search, which leads to a reduction in search omissions.

Furthermore, in the information processing apparatus 300, if it is likely that crossing of human figures may occur, tracking of a human figure is terminated, thereby preventing search for another object. In addition, the time when a human figure appears in the moving image captured by each camera is derived, thereby making it possible to accurately obtain a stay time of each human figure in the store.

An information processing apparatus according to a second exemplary embodiment which has a functional configuration different from that of the first exemplary embodiment will be described below.

Functional configurations in the second exemplary embodiment that are the same as those described in the first exemplary embodiment are denoted by the same reference numerals and descriptions thereof are omitted.

Figure 7:
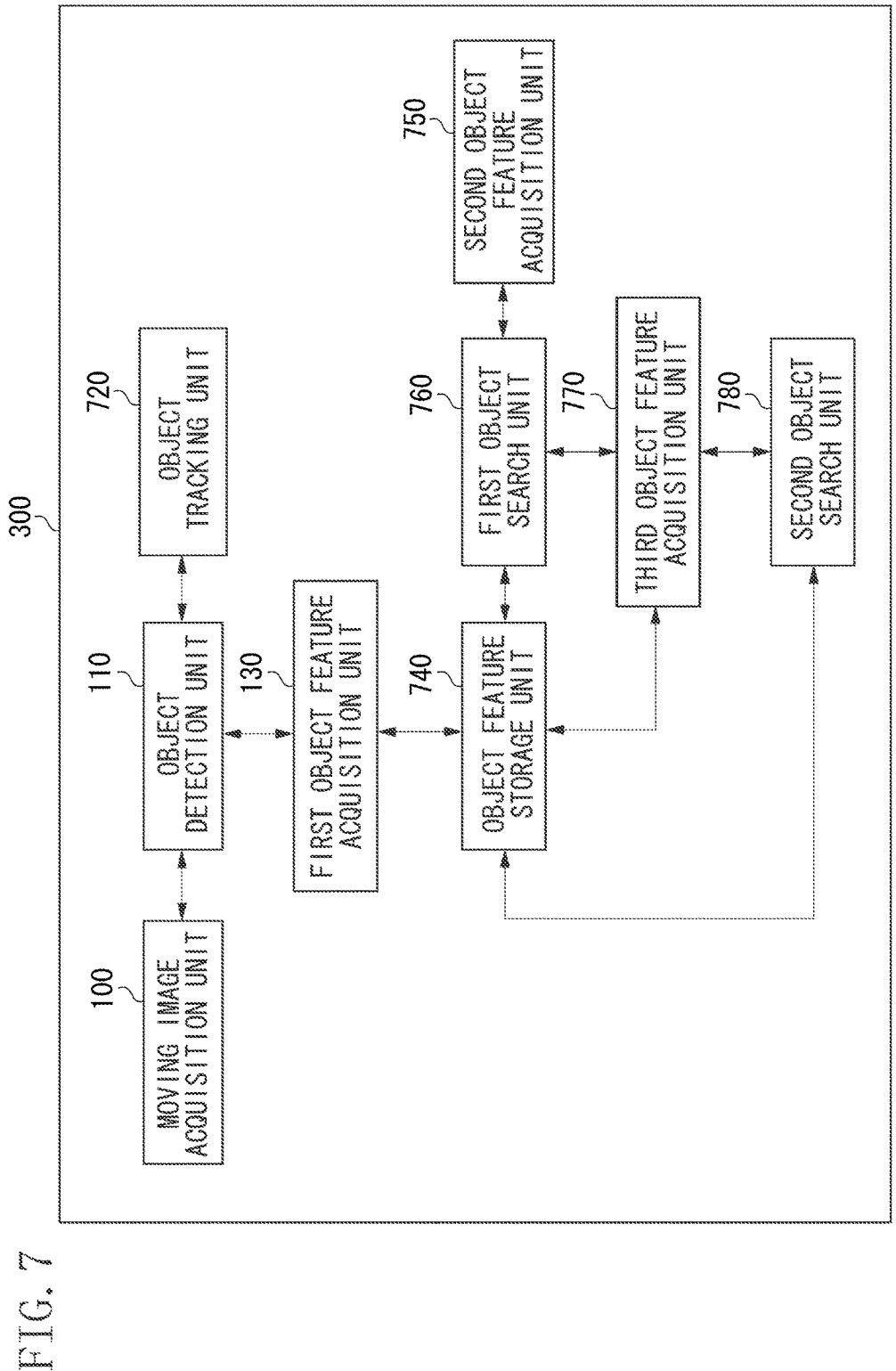
FIG. 7 is a block diagram illustrating an example of a functional configuration of an image processing apparatus according to one or more aspects of the present disclosure.

FIG. 7 is a block diagram illustrating an example of the functional configuration of the information processing apparatus 300 according to the present exemplary embodiment.

The moving image acquisition unit 100, the object detection unit 110, and the first object feature acquisition unit 130 which are included in the information processing apparatus 300 according to the present exemplary embodiment have the same functions as those described above in the first exemplary embodiment and thus descriptions thereof are omitted.

An object tracking unit 720, an object feature storage unit 740, a second object feature acquisition unit 750, a first object search unit 760, a third object feature acquisition unit 770, and a second object search unit 780 according to the present exemplary embodiment will be described below.

The object feature storage unit 740 stores feature amount acquired by the first object feature acquisition unit 130 in the external storage device 304.

Assume that the feature amounts according to the present exemplary embodiment are stored in association with coordinates of a rectangle presenting the position of a face detected by the object detection unit 110, i.e., X and Y coordinates (positional information) at upper left and lower right corners of the rectangle, the time (image capturing time) when an image of a face is captured, and the camera ID for uniquely identifying the camera which captures the image of a human figure.

A second object feature acquisition unit 750 acquires the feature amount of the face image of the human figure based on image capturing results (moving images) obtained by the network cameras 201 and 202 that capture images of human figures leaving the store. The second object feature acquisition unit 750 may be configured to acquire the feature amount of the face image of the human figure stored in the object feature storage unit 740.

A first object search unit 760 searches for the face of the human figure that is stored in the object feature storage unit 740 and appears in the moving images captured by the network cameras 203 to 216, based on the feature amount (query feature amount) of the face image acquired by the second object feature acquisition unit 750. Specifically, the similarity between the query feature amount and the feature amount stored in the object feature storage unit 740 is calculated and the feature amount having a predetermined similarity or higher is obtained.

The object tracking unit 720 tracks the feature amount of the face image stored in the object feature storage unit 740 based on the coordinates of the rectangle representing the position of the face stored in the object feature storage unit 740 in association with the feature amount searched for by the first object search unit 760.

The third object feature acquisition unit 770 acquires, from the object feature storage unit 740, the feature amount of the face image tracked by the object tracking unit 120.

A second object search unit 780 searches for the face of the human figure that are stored in the object feature storage unit 740 and appears in the moving images of the network cameras 203 to 216, based on the feature amount of the face image of the human figure acquired by the third object feature acquisition unit 770.

Figure 8:
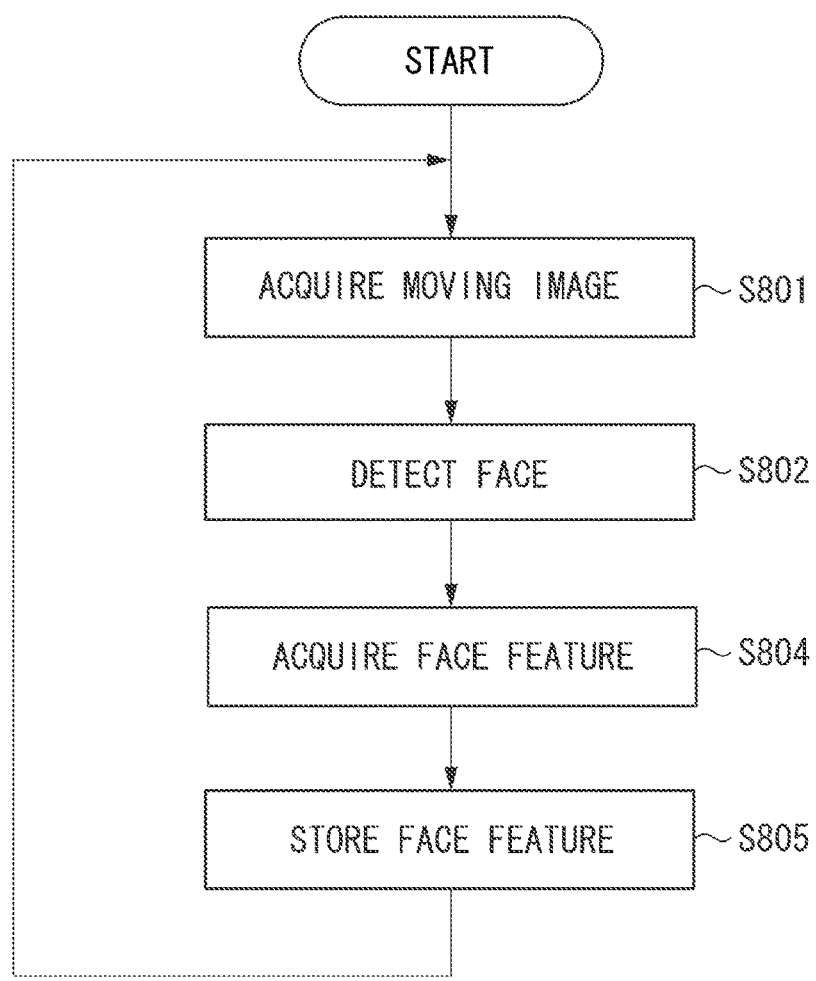
FIG. 8 is a flowchart illustrating an example of a processing procedure in which the information processing apparatus records a movement of each human figure in a store.

FIG. 8 illustrates a flowchart illustrating an example of a processing procedure in which the information processing apparatus 300 according to the present exemplary embodiment records a movement (entering or leaving the store and moving within the store) of each human figure in the store.

Each process illustrated in FIG. 8 is executed by functional units that are mainly implemented by the CPU 301. The processing of steps S801, S802, and S804 is similar to the processing of steps S401, S402, and S404, respectively, which are illustrated in FIG. 4, and thus descriptions thereof are omitted here. Similarly, the processing of steps S910 to S913 is similar to the processing of steps S510 to S513, respectively, which are illustrated in FIG. 5, and thus descriptions thereof are also omitted here.

In step S805, the object feature storage unit 740 stores the feature amount acquired by the first object feature acquisition unit 130 in the external storage device 304.

The feature amount is stored in association with the coordinates of the rectangle representing the position of the face detected by the object detection unit 110, i.e., X and Y coordinates at upper left and lower right corners of the rectangle, the time (image capturing time) when the image of the face is captured, and the camera ID of each network camera which captures the image of the human figure. After that, the processing returns to step S801.

FIG. 9 is a flowchart illustrating an example of a processing procedure in which the information processing apparatus 300 according to the present exemplary embodiment analyzes a movement of each human figure in the store and a movement path and a stay time of each human figure are derived based on the analysis result. Each process illustrated in FIG. 9 is executed by functional units that are mainly implemented by the CPU 301.

The processing of steps S901 to S907 is similar to the processing of steps S501 to 507, respectively, which are illustrated in FIG. 5 and thus descriptions thereof are omitted. However, in the present exemplary embodiment, the processing of step S903 is not necessarily required. If the processing of step S903 is omitted, there is no need to associate the feature amount with the human figure ID in the processing of step S905.

In the processing of step S906, if the face is detected at a lower end portion of a frame image in the processing of step S902, it is determined that a human figure with the face has exited the store.

In the processing of step S907, feature amounts other than the feature amount of the face detected at the lower end of the frame image are deleted from the RAM 303.

In step S908, the first object search unit 760 searches for the feature amount of the face image of the same human figure as the human figure that has exited the store from the object feature storage unit 740, based on the feature amount of the face image acquired in the processing of step S907.

In this processing, the search method is similar to that in the processing of step S508, but there is no need to obtain a human figure ID as a search result. Instead of deriving the human figure ID, coordinates (coordinates of a rectangle face area) of the rectangle representing the position of the face, the image capturing time, and the camera ID that are stored in the object feature storage unit 740 in association with the feature amount of the face image are obtained as a search result.

The object tracking unit 720 tracks the face stored in the object feature storage unit 740 for each camera ID based on the search result obtained in the processing of step S908. This tracking process can be carried out by identifying the face that can be recognized as the face of the same human figure as that of the search result from the time and positional relationship by using a Kalman filter or the like based on, for example, the coordinates of the rectangle representing the face image captured at a time near the image capturing time obtained as a search result.

Since the object feature storage unit 740 stores the feature amount of the face image, it may be difficult to make the determination, for example, when crossing of human figures occurs. In such a case, it may be determined that the human figures are the same human figure according to the similarity between the feature amounts. As for the face that is determined to be the face of the same human figure as a result of tracking, a human figure ID for discriminating the human figure is assigned to the human figure and stored in the object feature storage unit 140.

In step S909, the third object feature acquisition unit 770 acquires, from the object feature storage unit 740, the feature amount of the face image that is identified as the face of the same human figure.

As described above, the information processing apparatus 300 according to the present exemplary embodiment can delete inconsistent search results by using the image capturing time. This makes it possible to effectively avoid searching for another object. In addition, it is possible to obtain a movement path and a stay time more accurately.

Further, the display mode for displaying the movement path and stay time is changed depending on the threshold value for the similarity used in the second object search unit 780, thereby enabling determination of the reliabilities of the movement path and stay time.

The exemplary embodiments described above illustrate an example in which human figures are searched by a plurality of cameras installed in a store and a movement path and a stay time of each human figure are obtained. The present disclosure is not limited to this example. The present disclosure can be widely applied to search for objects other than human figures appearing in images captured by a plurality of cameras installed in an area different from a store and derivation of a movement path and a stay time.

For example, to analyze the flow of people in an urban area, a plurality of cameras including cameras for capturing images of people entering and leaving the urban area may be installed, and a movement path and a stay time of each person from when the person enters the area to when the person leaves the area may be obtained. In such a case, features of a human figure, such as his/her clothes, body shape, gait, or the like, may be used instead of using the feature amount of a face image to identify an individual.

The present disclosure can also be applied to a case where, to observe the behavior of livestock in a farm, a plurality of cameras is installed in the farm and a movement path and a stay time of each farm animal from when the animal leaves the barn to when the animal goes back to the barn are obtained. In this case, to identify a farm animal, for example, cows with black and white spots can be individually identified based on the spot pattern of each cow.

The exemplary embodiments described above are merely the examples for describing the present disclosure in detail, and the scope of the present disclosure is not limited to these examples.

According to the exemplary embodiments described above, it is possible to efficiently recognize, in areas where a plurality of image capturing apparatuses is installed, the appearance of a target human figure (object) in an image captured by each of the plurality of image capturing apparatuses.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-135652, filed Jul. 11, 2017, which is hereby incorporated by reference herein in its entirety.

What is claimed is:

1. An information processing apparatus comprising:
   a moving image acquisition unit configured to acquire a moving image captured by each of a plurality of image capturing apparatuses in an area in which the plurality of image capturing apparatuses is installed;
   a detection unit configured to detect an object appearing in a frame image of the acquired moving image;
   a first feature acquisition unit configured to acquire an image feature of the detected object;
   a storage unit configured to store the acquired image feature;
   a tracking unit configured to track the detected object in one moving image;
   a second feature acquisition unit configured to acquire an image feature of an object to be searched from among the detected object;
   a first search unit configured to search for an object having a similarity equal to or higher than a predetermined threshold from among image features stored in the storage unit and identify the object, based on the image feature acquired by the second feature acquisition unit;
   a third feature acquisition unit configured to acquire an image feature of the object tracked by the tracking unit and corresponding to the object identified by the first search unit from among the image features stored in the storage unit; and
   a second search unit configured to search for an object having a similarity equal to or higher than the predetermined threshold from among the image features stored in the storage unit and identify the object, based on the image feature acquired by the third feature acquisition unit.

2. The information processing apparatus according to claim 1, wherein the storage unit stores the object tracked as a target by the tracking unit in association with an image feature of the object.

3. The information processing apparatus according to claim 1, wherein
   the storage unit stores positional information about the object detected by the detection unit in association with the image feature of the object, and
   the tracking unit performs tracking based on the positional information about the object.

4. The information processing apparatus according to claim 1, wherein the second search unit excludes an image feature specified based on a predetermined condition from a plurality of image features acquired by the third feature acquisition unit and performs a search.

5. The information processing apparatus according to claim 4, wherein the predetermined condition is a condition associated with a similarity between image features of objects tracked by the tracking unit.

6. The information processing apparatus according to claim 4, wherein the predetermined condition is a condition associated with a similarity between image capturing conditions.

7. The information processing apparatus according to claim 1, wherein the second search unit repeatedly performs a search while sequentially lowering a threshold for a similarity used to identify the object.

8. The information processing apparatus according to claim 1, wherein the tracking unit determines whether crossing of objects to be tracked occurs, and when determining that crossing of the objects occurs, the tracking unit terminates tracking.

9. The information processing apparatus according to claim 1, wherein
   the storage unit stores the image feature in association with a time when the moving image is captured,
   the second search unit derives a time when the object to be searched appears in each moving image based on a result of the search by the second search unit.

10. The information processing apparatus according to claim 9, wherein the second search unit excludes an inconsistent search result from the result of the search based on a result of the derivation by the deriving unit.

11. The information processing apparatus according to claim 9, wherein the deriving unit calculates a movement path of the object based on a result of the derivation.

12. The information processing apparatus according to claim 11, further comprising a display unit configured to display the movement path of the object, wherein the display unit changes a display form of the movement path depending on a threshold value for a similarity used by the second search unit.

13. The information processing apparatus according to claim 12, wherein the display unit displays the movement path with a line that connects the plurality of image capturing apparatuses with one another in order of appearance of the object.

14. The information processing apparatus according to claim 9, wherein the deriving unit calculates a stay time of the object based on a result of the derivation.

15. The information processing apparatus according to claim 14, wherein the deriving unit calculates the stay time of the object based on an earliest appearance time and a latest disappearance time of the object in the plurality of image capturing apparatuses.

16. The information processing apparatus according to claim 14, further comprising a display unit configured to display the stay time of the object.

17. The information processing apparatus according to claim 1, wherein the object detected by the detection unit is a face of a human figure.

18. The information processing apparatus according to claim 1, wherein the object detected by the detection unit is a human body.

19. A control method of an information processing apparatus, comprising:
   acquiring a moving image captured by each of a plurality of image capturing apparatuses in an area in which the plurality of image capturing apparatuses is installed;
   detecting objects appearing in a frame image of the acquired moving image;
   acquiring an image feature of the detected object;
   storing the acquired image feature;
   tracking the detected object in one moving image;
   acquiring an image feature of an object to be searched from among the detected object;
   searching for an object having a similarity equal to or higher than a predetermined threshold from among stored image features and identifying the object, based on the acquired image feature;
   acquiring image feature of the tracked object corresponding to the identified object from among the stored image features; and
   searching for an object having a similarity equal to or higher than the predetermined threshold from among the stored image features and identifying the object, based on the acquired image feature.

20. A non-transitory computer-readable storage medium storing a computer program for causing a computer to operate as an information processing apparatus, the computer program causing the computer to function as:
   a moving image acquisition unit configured to acquire a moving image captured by each of a plurality of image capturing apparatuses in an area in which the plurality of image capturing apparatuses is installed;
   an object detection unit configured to detect an object appearing in a frame image of the acquired moving image;
   a first feature acquisition unit configured to acquire an image feature of the detected object;
   a storage unit configured to store the acquired image feature;
   a tracking unit configured to track the detected object in one moving image;
   a second feature acquisition unit configured to acquire an image feature of an object to be searched from among the detected object;
   a first search unit configured to search for an object having a similarity equal to or higher than a predetermined threshold from among the image features stored in the storage unit and identify the object, based on the image feature acquired by the second feature acquisition unit;
   a third feature acquisition unit configured to acquire an image feature of the object tracked by the tracking unit and corresponding to the object identified by the first search unit from among image features stored in the storage unit; and
   a second search unit configured to search for an object having a similarity equal to or higher than the predetermined threshold from among the image features stored in the storage unit and identify the object, based on the image feature acquired by the third feature acquisition unit.

* * * * *